United States Patent [19]

Major et al.

[11] 3,736,499

[45] May 29, 1973

[54] SYSTEM AND METHOD FOR MAGNETICALLY TESTING PLATED WIRE

[75] Inventors: James M. Major, Willingboro; Peter J. Truscello, Berlin, both of N.J.; Robert Provasnik, Philadelphia, Pa.

[73] Assignee: Computer Test Corporation, Cherry Hill, N.J.

[22] Filed: Aug. 17, 1970

[21] Appl. No.: 64,309

[52] U.S. Cl.......324/34 R, 340/174 TC, 340/174 PN
[51] Int. Cl. ............................................G01r 33/12
[58] Field of Search......................324/34 R, 34 MC; 340/174 TC, 174 PN

[56] References Cited

UNITED STATES PATENTS 3,522,523   8/1970   Portas ....................................324/34

OTHER PUBLICATIONS

Chernow; G.; Boosting Plated Wire Yield; Electronics, Sept. 1, 1969; pp. 95–96

Primary Examiner—Robert J. Corcoran
Attorney—Maleson, Kimmelman and Ratner and Allan Ratner

[57] ABSTRACT

A method and system for magnetically testing discrete regions of plated wire used to provide storage memory elements in computers. The system provides for controlled movement and positioning of the plated wire within an electronic test station responsive to coded current test signals from a magnetic test system. A motorized drive assembly moves the plated wire through the test station and is actuated by command signals sent by a control system. The control system may be automatically controlled by signals generated from the magnetic test system or manually by operator instructions to actuate the motorized drive assembly.

24 Claims, 4 Drawing Figures

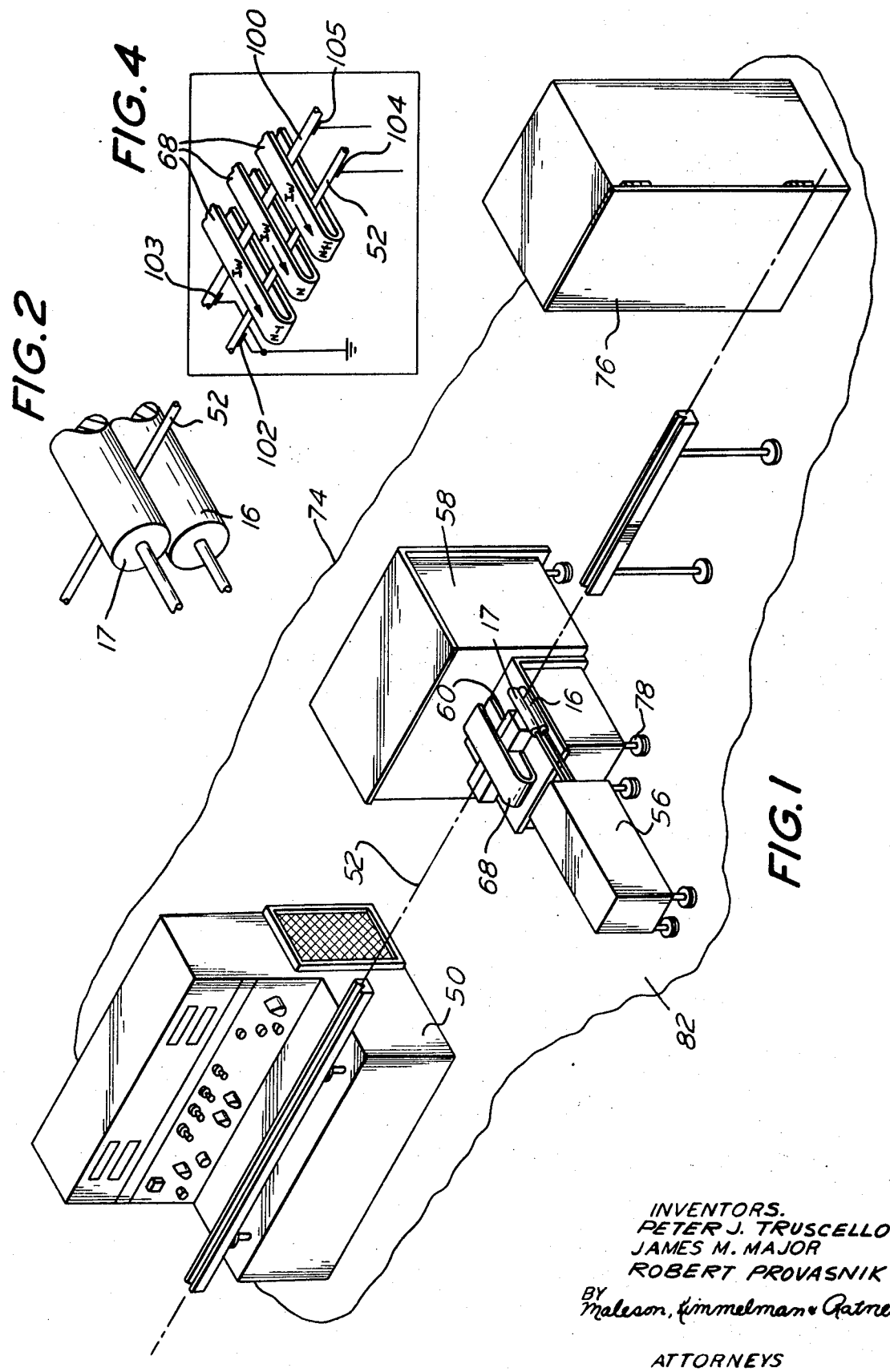

SYSTEM AND METHOD FOR MAGNETICALLY TESTING PLATED WIRE

BACKGROUND OF THE INVENTION

1. Field of the Invention

This invention relates to a system for testing plated wire to be used as memory storage elements in computers.

2. Prior Art

Systems to test plated wire elements for computers have been known in the art though such prior systems have not automatically positioned and moved the plated wire within a particular test station. Further, the prior art has not provided test system control of the positioning and testing of the plated wire elements. Plated wire has been positioned and moved through the test station manually. Manual manipulation of the plated wire causes a risk of damage to the plated wire by the operator unknowingly straining or torquing the wire. Further, such manual operation of the wire through a test station causes unacceptable measurement tolerances when the plated wire testing is to be done at small incremental points along the wire. Accordingly, the prior art has not achieved a plot of an output plated wire profile versus precise position measurements since manual manipulation can not achieve acceptable positioning tolerances. In addition, prior system testing, since mannually operated, can not undergo comprehensive testing and still match the regulated speed of the wire during the plating process.

SUMMARY OF THE INVENTION

A method and system for magnetically testing discrete regions of a plated wire element. The plated wire element is magnetically tested within a test station which switches the magnetic state of the regions in accordance with a predetermined control signal from a magnetic test system. A moving system translates the plated wire element to a next predetermined test region within the test station in accordance with the control signal.

BRIEF DESCRIPTION OF THE DRAWINGS

FIG. 1 is a perspective view of the total system for controlling the testing of plated wire including the motorized drive assembly, test station, control frame and testing assembly circuitry panel;

FIG. 2 is a perspective view of the drive and pinch roller in an operating mode;

FIG. 4 is a representation of the plated wire within the test station being encompassed by three word straps.

Referring to FIGS. 1 and 3, there is shown magnetically testing discrete regions of plated wire element 52 within test station 58 in which the magnetic state of the regions are switched in accordance with a control signal from magnetic test system 88. Motorized drive assembly 56 mechanically drives plated wire element 52 in a controlled mode of operation to position plated wire element 52 within test station 58 in accordance with the signal generated from magnetic test system 88 or in response to manual operation by an operator of the magnetic test. Plated wire element 52 is used in computer technology to provide main storage memory elements. Since plated wire element 52 is magnetic and has a preferential direction of magnetization, it may be used as a nondestructive memory element for main storage in computers as described in IEEE Transactions on Magnetics, Vol. Mag-5, No. 4, December 1969 "Plated-Wire Technology: A Critical Review" by Mathias and Fedde, pages 728 – 748.

In test and in operation, information is placed according to the direction of the circumferential magnetization in plated wire element 52. A clockwise magnetization state on plated wire element 52 may represent a one and an opposite magnetization may represent a zero stored in an element or vice versa. As shown in FIG. 4, a word current is applied to word strap 68 which is an electrically conductive member in the form of two horizontal straps on opposing sides of plated wire element 52 extending in a direction perpendicular to wire axis direction. The word current in word strap 68 induces a word field in plated wire element 52 along the wire axis direction. The word field induced by current change in word strap 68 causes a change in direction of the magnetization vector from a circumferential null position toward wire axis direction 72. With a known current input to word strap 68 and a read out of the voltage induced by the change in magnetic flux from the test region of element 52, a measure of the effectiveness of the element may be made with regard to its use as a memory device.

Figure 3:
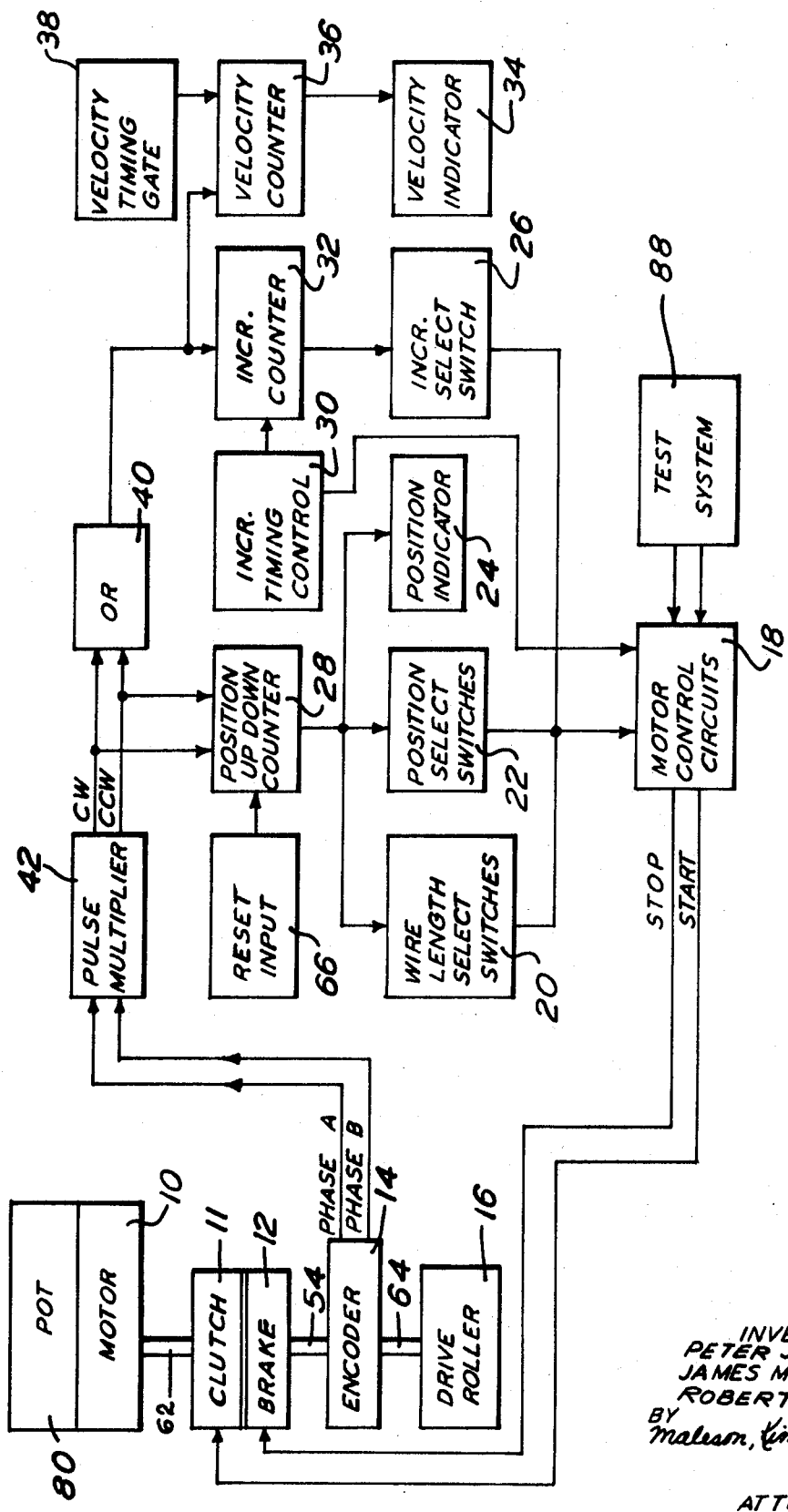
FIG. 3 is a block diagram of the control frame electronics logic in conjunction with a schematic representation of the motorized drive assembly.

Electronic tests are accomplished by placing a test region through test site 60 of test station 58. Motorized drive assembly 56 provides the proper movement for linear translation of plated wire element 52 and provides readings on speed and direction of movement to be read into control system 50 circuits which control stop/start as well as speed determination commands to be sent to motorized drive assembly 56.

Motorized drive assembly 56 actuates drive roller 17 mechanically to force movement of plated wire 52 at a controlled rate. Translation is monitored through encoder 14 the signals from which are fed to control 50 which in turn actuates logic circuits to transport plated wire element 52 at a predetermined controlled rate. This sytem is connected to clutch 11 and brake 12 which close the electrical loop and mechanically cause plated wire element 52 to be actuated in accordance with the applied command signals.

Main driving force to motorized drive assembly 56 is controlled by motor control circuit block 18 which may remotely command stop/start procedures from magnetic test system 88 in an automatic mode, locally command instructions from control frame 50 electronic logic, or provide a manual command function in which motorized drive assembly 56 is controlled by operator's instructions.

The system for controlling plated wire element 52 testing within test station 58 driven by motorized drive assembly 56 may operate in a variety of modes of operation. Basic operating modes may be through a remote operation where magnetic test system 88 controls the motion of plated wire element 52. Operation may be local where motor control circuits 18 are monitored manually by the operator. Under the main operations of automatic or manual operation, motorized drive assembly 56 may be operated either in a continuous or incremental driving mode of operation. In the continuously operating system, plated wire element 52 is linearly translated at a rate of speed chosen by the operator and controlled by potentiometer speed control 80 of motor 10. Incremental drive allows plated wire element 52 to be driven through test station 58 for a predetermined length and to stop motorized drive assembly 56 at that point. Finally, position select operating mode may be selected in order to stop plated wire element 52 at a preselected length when the basic operating mode is automatic. The mechanisms associated with operating modes are further described in detail in the following paragraphs.

MOTORIZED DRIVE

Motorized drive assembly 56 shown in FIGS. 1 and 2 comprises drive mechanisms for plated wire element 52 actuated by control system 50 and represents the transport means by which plated wire element 52 is driven in a controlled manner through test station 58. Motor 10, clutch 11, brake 12, encoder 14, drive roller 16 and pinch roller 17 connected by shaft 54 combine to form motorized drive assembly 56. Motorized drive assembly 56 is rigidly mounted on motorized test assembly bed 82 in alignment with test station 58 to accept plated wire 52 through interface between drive roller 16 and pinch roller 17.

Plated wire element 52 to be tested in test station 58 is placed between drive roller 16 and pinch roller 17. These rollers are mounted with pinch roller 17 being vertically placed above drive roller 16 and then spring loaded to maintain contact between the respective rollers. Rollers 16 and 17 provide the frictional driving force to linearly transport plated wire element 52. Pinch roller 17 is cylindrical in construction and coated with Teflon to contact plated wire element 52 and drive roller 16 which is also cylindrical and coated with a softening material such as urethane in order not to mar test specimen or plated wire element 52 as it is frictionally transported between rollers 16 and 17. Pinch roller 17 is spring loaded to maintain a constant pressure to lateral sides of contacting surfaces of rollers 16 and 17, and is mounted in rotatable fashion about an axis parallel and in the same plane as shaft 54.

Drive roller 16 is fixedly attached to shaft 54 and rotates responsive to movement of this element. Pinch roller 17 is driven in an opposite rotational mode with respect to rotation of drive roller 16. Accordingly, rollers 16 and 17 provide a pull system through a test site 60 of test station 58 which pulls elements 52 at a controlled rate of movement.

Motor 10 is a standard dc drive motor mechanically connected to clutch 11 and brake 12 through motor shaft 62. Motor shaft 62 responsively rotates with respect to motor 10, driving clutch 11 and drive roller 16 as well as encoder 14. In operation, motor 10 continually drives motor shaft 62 in either a clockwise or counterclockwise (CCW) motion. When plated wire 52 is to be stopped, clutch 11 is disengaged and brake 12 is engaged, thereby stopping movement of plated wire element 52 while allowing motor 10 to continue rotation.

Motor 10 moves plated wire 52 at a controlled rate of linear speed from 5 mils per second up to 60 inches per minute through drive roller 16 and pinch roller 17. Speed control of rotational movement of motor 10 is maintained through operator instructions by potentiometer 80. Increase in the electrical resistance causes a controlled decrease in motor 10 rotational speed and consequently a decrease in linear velocity of plated wire element 52. Since motor 10 is dc, the rotational velocity may be reversed from clockwise to counterclockwise or vice versa by an appropriate change in the current direction applied to motor 10.

Encoder 14 is a standard mechanism to measure the rotational speed of drive roller 16 which is converted to give linear translation speed of plated wire element 52 as well as a reading on whether encoder shaft 64 is rotating in a clockwise or counterclockwise mode. Encoder 14 may be a disc, hard mounted to shaft 54 and encoder shaft 64 which rotates at the same angular velocity as these shafts. Within the plane of the disc may be openings through which a light source shines to light sensitive elements on an opposing side of disc plane. Through this mechanism, timed light pulses transmit data to control frame 50 electronic circuits, later described, to control speed and stop/start commands read back to motorized drive assembly 56. Encoder 14 pulses are fed into control system 50 where they are counted in reference to number per second then displayed at a speed rate, and then displayed in relationship to the mils of test specimen 52 which has passed through test site 60.

CONTROL SYSTEM

Control system 50 handles encoder pulses, speed of plated wire element 52, increment counting, velocity timing and stop/start controls for motorized drive assembly 56. This sytem provides basic control for positioning, incrementing and preset positioning of plated wire element 52 within test station 58.

Referring to FIG. 3, motor control circuit block 18 controls motorized drive assembly 56 in a stop/start mode of operation. When motor control 18 generates a start signal, voltage is applied to motor 10 and clutch 11 is engaged through shaft 54 with encoder 14. Where a stop signal is generated from motor control circuit block 18, brake 12 is engaged and clutch 11 is disengaged. When brake 12 is engaged, clutch 11 is disengaged and vice versa.

Encoder 14 generates two signals, phase A and phase B dependent upon rotational direction of shaft 54 and rotational speed of encoder shaft 64 and correspondingly to linear speed of test specimen 52. A standard pulse multiplier is represented by block 42 wherein light signals generated by encoder 14 are generally weak in nature and must be magnified for useful input to the remaining circuitry by pulse multiplier 42. The signals generated from block 42 are either on a clockwise or counterclockwise line as determined by signal input from encoder 14. Pulses leaving block 42 correspond to the time interval that it takes one mil of plated wire element 52 to pass through drive roller 16. Encoder 14 signal generation is a function of rotational speed of shaft 54 and drive roller 16 as well as the velocity of test specimen 52 passing through test site 60. Encoder 14 then correlates rotational motion to linear motion of plated wire element 52 and generates corresponding signals.

The signal exits from pulse multiplier block 42 either on a clockwise or counterclockwise line and enters position counter, block 28. On a clockwise pulse, the count in position counter 28 is increased by one and on a counterclockwise pulse, the count is decreased by one. The two separate and distinct lines from block 42 enable position counter 28 to operate in a double mode to increase or decrease the count associated with the proper line input.

Reset input block 66 initializes position counter 28 upon insertion of plated wire 52 through drive roller 16. This operation sets the proper count in position counter 28 to correspond to the linear distance from one end of plated wire 52 to the end of N word strap 68.

The output from position counter block 28 is applied to wire length select switches 20, position select switches 22 and position indicator 24. Wire length select switches 20 are set to the maximum length of plated wire element 52 that is being tested. Switches 20 continuously monitor and sample signals derived from position counter 28. When a signal exiting from position counter 28 is identical to predetermined setting of wire length select switches 20, then a signal is applied to motor control 18 to engage brake 12, disengage clutch 11 and stop rotation of shaft 54. This in turn stops linear motion of test specimen 52 although motor 10 is still in a rotational mode of operation. The foregoing affects automatic control of the plated wire element 52 movement in order that the user will not lose control by driving it completely past drive roller 16.

As an alternate to wire length select switches 20, position select switches 22 may be engaged to select a particular position of plated wire element 52 and the user may wish a stop command sent from motor control 18. Position select switches 22 are set to a particular numeric reading and the signal exiting position counter 28 is continually monitored until counter 28 and position switches 22 are identical. When this occurs, a stop command is issued and the process of engaging brake 12 to halt rotation of shaft 54 is repeated as was described in the operation of wire length select switches 20.

Position indicator 24 also accepts a signal from position counter 28 to display the count that is stored in position counter 28 in a five digit series.

In summary, with a preset length of wire 52 to be tested within test station 58, a stop command may be automatically sent to motor 10 engaging brake 12, disengaging clutch 11 and stopping the linear motion of test specimen 52. Similarly, a preset position may be returned to test site 60 by reversing rotational movement of motor 10 in conjunction with actuation of position select switches 22 and position counter 28.

Another mode of operation shown in FIG. 3 is incremental movement in which plated wire element 52 is moved through selected increments of 10, 100, 250, 500, 750 or 1000 mils. Under automatic operation in the incremental mode, test specimen 52 is stopped by motorized drive assembly 56 for a preselected time of 1, 2, 5 or 10 seconds, then automatically actuated and stopped for another preset increment of time. Under manual operation in the incremental mode, plated wire element 52 is only moved through a specific predetermined increment when motor control circuits 18 is manually actuated. Upon completion of the movement, plated wire element 52 remains stationary until the next manual actuation. The incremental mode of operation is useful when plated wire testing is performed in conjunction with a plotter in which output voltage from the element is applied to a plotter to determine the amplitude of the wire response.

Increment counter 32, increment timing control 30 and increment select switch 26 control the incremental mode of operation. In order to enter the increment mode of operation, the signal applied on either a clockwise or counterclockwise line out of pulse multiplier 42 enters OR circuit 40 which combines the clockwise and counterclockwise lines and transmits the signal on a common line to increment counter 32.

In operation in the increment mode, increment select switches 26 are set to provide a reading for length of test specimen 52 to be laterally moved. As described previously, seven separate increments may be set by increment select switches 26; these are 10, 100, 250, 500, 750 or 1000 mil increments. Pulses, whether clockwise or counterclockwise, exit from OR circuit 40, enter increment counter 32 and continue until increment counter 32 holds a count equal to the value set on increment select switches 26. When the counts are determined to be equal, a signal passes through the block circuit to motor control 18 which issues a stop command. When the stop command is issued, increment timing control block 30 is activated either in a manual or automatic mode.

If the automatic mode of operation is in effect, after the preselected time interval of 1, 2, 5 or 10 seconds, a signal generated from increment timing control 30 enters motor control 18 which issues a signal to disengage brake 12, engage clutch 11, driving shaft 54, drive roller 16 and encoder 14. As clockwise or counterclockwise pulses occur, they again pass through pulse multiplier block 42, block 40 and are counted in increment counter 32 until the count is equal to setting on increment select switches block 26. A stop command is then issued by motor control 18 and test specimen 52 is held in position until increment timing control 30 indicates that the preselected time has passed.

If the manual mode of operation is in effect, increment timing control block 30 is effectively disconnected from the circuit and has no effect on the increment mode of operation. As in the case of automatic operation, increment counter 32 accepts pulses from circuit 40 until the count reaches that indicated by the increment switches 26. At this point, a signal enters motor control 18 which issues a stop command. When plated wire element 52 has moved the selected increment and stops, a manual start must be initiated to motor control 18 to remove brake 12, engage clutch 11 and reset increment counter 32 (as pulses are received from the now actuated encoder 14).

Separate and distinct from incremental or positioned control of plated wire 52, control system 50 also provides linear velocity indicators to display translative velocity of plated wire element 52. Duplication of off-line speeds with on-line plated wire element 52 speeds is desirable since one of the functions in off-line testing is to correlate off-line test results with on-line functions.

Clockwise and counterclockwise pulses passing through circuit 40 are counted as they occur in velocity counter 36. Velocity timing gate generator 38 inputs a signal to velocity counter 36. Block 38 supplies a gating signal for velocity counter 36 which is supplied for one second and then shut down for one second. During the second that the gating signal is applied, velocity counter 36 counts the pulses exiting from circuit 40, each pulse corresponding to a mil of plated wire 52 moving through drive roller 16. When the gating signal is off, the velocity of plated wire element 52 is displayed on velocity indicators 34 indicating the velocity for the previous second in mils per second on a three digit indicator screen. While the gate signal is off, velocity counter 36 is not counting and corresponds to a one second display time on velocity indicator 34.

TEST STATION 58

Test station 58 provides specific current pulses through word straps 68 to cause changes in direction of the magnetization vector within plated wire element 52. These changes are measured and determined to be within acceptable limits or are rejected. Test station 58 is mounted on test station bed 70 which is positioned perpendicular to shaft 54 of motorized drive assembly 56 in a manner such that plated wire 52 may be accepted through test site 60. Mounting members 78 provide means by which test site 60 may be vertically aligned with plated wire element 52 which passes through the interface of pinch roller 16 and drive roller 17.

As shown in FIG. 4 a plated wire element 52 is inserted between word straps 68 in test site 60. In addition, a nonplated wire element 100 is inserted within straps 68 and parallel to element 52. An electrical connection is made at one end of elements 52 and 100 by mercury contacts 102 and 103 respectively with these mercury contacts being connected to ground. At the other end of element 52 and 100, mercury contacts 104 - 5 respectively are taken as outputs and applied to the minus and plus inputs of a differential sense amplifier 110. In addition, mercury contact 104 for element 52 and word straps 68 are connected to magnetic test system 88.

On command from test system 88, a group of predetermined unipolar word current pulses are applied to straps 68. Further, a group of predetermined bipolar bit pulses are applied to element 52 by way of contact 104. The direction of magnetization vectors within element 52 are thus changed and correlated. The coded current sources correspond to a preset mode of operation and are applied by magnetic test system 88. Although the proper coded signals are applied at test station 58, they are directly responsive to command signals from system 88. Test results from coded current sources applied at test site 60 are transmitted back to magnetic test system 88 wherein the test signal is shown to be within test tolerances or rejected.

MAGNETIC TEST SYSTEM

As described in detail in patent application, Ser. No. 64,158 for Magnetic Storage Element Testing System and Method, assigned to the same assignee as the present invention now U.S. Pat. No. 3,655,959, magnetic test system 88 provides electrical test signals to station 58 for plated wire element 52. At the conclusion of a predetermined test, magnetic test system 88 issues a command or control signal to test station 58 and control frame 50 to initiate mechanical drive of motorized drive assembly 58 to move plated wire 52 to the next test region.

In operation, motorized drive assembly 56, in conjunction with motor control circuits block 18 of control frame 50, establishes a position reference with respect to a specific element of plated wire 52 under test. The region to be tested is thereby defined with respect to the position reference. When motorized drive assembly 56 has translated plated wire element 52 to a proper test region within test station 58, a signal is issued to magnetic test system 88 to initiate tests of the region under consideration represented by test system 88 in FIG. 3. Upon completion of required electrical tests, a test system command 86 is issued by magnetic test system 88 to motor control circuits block 18 to initiate motorized drive assembly 56 and transport plated wire element 52 to the next test region when an automatic mode of operation has been chosen. In manual operation, after testing by magnetic test system 88, the operator actuates manual controls to move test specimen 52 to the next test region.

Upon an error detection found in test system block 88, a command signal through test system command block 86 is transmitted to motor control circuits block 18 to issue a stop to motorized drive assembly 56. Plated wire element 52 may be controlled in the stop mode to within 5 mils of tolerance. Program sequences being generated from magnetic test system block 88 continue to permit the operator to view the sense output directly at the error location on plated wire 52. Clutch 11 system allows the operator to manually move plated wire 52 in either a forward or reverse direction with 1 mil resolution in order to investigate the parameters in the immediate area of concern. In this mode of operation, the operator actuates manual drive block 90 to command motor control circuits block 18 into a proper directional control of motor 10, drive roller 16, pinch roller 17 and finally plated wire element 52.

What is claimed is:

1. A system for magnetically testing discrete regions of a plated wire element, comprising
   a. a test station for switching the magnetic state of said regions in accordance with a predetermined control signal,
   b. a magnetic test system for testing said plated wire element and generating said predetermined control signal to said test station, and
   c. moving means to translate said plated wire element to a next predetermined test region within said test station in accordance with said predetermined control signal.

2. The system as recited in claim 1 wherein said moving means to translate said plated wire element comprises
   a. transport means for linearly translating said plated wire element through said test station,
   b. encoder means responsive to translation of said transport means to determine direction and speed of movement of said plated wire element and to generate a signal corresponding thereto, and
   c. control means for said plated wire element connected to said test system, said transport means and said encoder means to control said transport means and position and increment said plated wire element in accordance with said signal from said encoder means and said test means.

3. The system as recited in claim 2 wherein said transport means comprises motor means to provide actuation of said plated wire element into and out of said test station.

4. The system as recited in claim 3 wherein said control means comprises:
   a. positioning means in accordance with said signal generated from said encoder means to position said plated wire element within said test station by controlled actuation of said motor means, and;
   b. motor control means to control speed and direction of rotation of said motor means.

5. The system as recited in claim 4 wherein said control means comprises incrementing means to move said plated wire element an increment of length through said test station.

6. A system for controlling the testing of discrete regions of a plated wire element to provide controlled movement and positioning of said plated wire element therein, comprising
   a. a test station for switching the magnetic state of said regions of said plated wire element,
   b. transport means for linearly translating said plated wire element through said test station,
   c. encoder means responsive to translation of said transport means to determine direction and speed of movement of said plated wire element and to generate a signal corresponding thereto, and
   d. control means for said plated wire element connected to said transport means and said encoder means to control said transport means to position and increment said plated wire element in accordance with said signal from said encoder means.

7. The system as recited in claim 6, wherein said transport means comprises
   a. motor means to provide actuation of said plated wire element into and out of said test station, and
   b. motor control means to control speed and direction of rotation of said motor means.

8. The system as recited in claim 7 wherein said motor control means comprises
   a. a clutch fixedly attached and rotatively responsive to said motor means to engage said motor means and linearly translate said plated wire element,
   b. a brake attached to said motor means to stop linear translation of said plated wire element, and
   c. motor control circuit means to generate a signal to said clutch and said brake to linearly translate and to stop movement of said plated wire element respectively.

9. The system as recited in claim 8 wherein said motor means comprises
   a. a dc motor, and
   b. a potentiometer to provide varying rotational speed control for said motor.

10. The system as recited in claim 6 wherein said control means comprises positioning means responsive to said signal generated from said encoder means to position said plated wire element within said test station by controlled actuation of said transport means.

11. The system as recited in claim 10, wherein said control means for said plated wire element comprises incrementing means responsive to said signal generated from said encoder means to move said plated wire element a specific increment of length through said test station by controlled actuation of said transport means.

12. The system as recited in claim 11 wherein control means comprises preset positioning means to allow return movement to a predetermined position of said plated wire element by controlled actuation of said transport means.

13. The device as recited in claim 6 wherein said transport means comprises
   a. a cylindrical drive roller, and
   b. a cylindrical pinch roller having a lateral surface in frictional contact with said cylindrical drive roller to rotate responsively to said drive roller and permit said plated wire element to contact said drive roller and said pinch roller and permit linear translation therebetween.

14. The device as recited in claim 13 wherein said pinch roller is spring loaded to maintain frictional contact between said drive roller and said pinch roller.

15. The device as recited in claim 14 wherein said drive roller is coated with urethane material on said surfaces contacting said pinch roller.

16. The device as recited in claim 15 wherein said pinch roller is coated with teflon material on said lateral surfaces contacting said drive roller.

17. A method for magnetically testing discrete regions of a plated wire element, comprising the steps of
   a. positioning said plated wire element within a test station in accordance with a predetermined control signal,
   b. magnetically testing said plated wire element, and
   c. moving said plated wire element to a next predetermined test region within said test station.

18. The method of claim 17 further providing the step of generating a command signal to a magnetic test system to perform magnetic testing of said plated wire element within said test station.

19. The method of claim 17 further providing the step of transporting said plated wire element to a next predetermined test region in an incremental manner in accordance with said predetermined control signal.

20. The method of claim 17 further providing the step of transporting said plated wire element to a next predetermined test region in a continuous manner in accordance with said predetermined control signal.

21. The method of claim 17 further providing the step of transporting said plated wire to a next predetermined test region by manual control of said plated wire element within said test station.

22. The method of claim 17 further providing the step of halting the progressive movement of said plated wire element wherein said magnetic testing detects said plated wire element to be out of tolerance.

23. The method of claim 22 further providing the step of driving said plated wire element through said test station by a motor actuation in accordance with said predetermined control signal to control speed and direction of rotation of said motor.

24. The method of claim 23 further providing the step of encoding said motor speed and direction of rotation by an encoder element to determine said speed and direction of rotation of said motor.

* * * * *